United States Patent [19]

Rieux

[11] 4,287,111
[45] Sep. 1, 1981

[54] COMPOSITIONS USEFUL FOR CONSOLIDATION OF MINING DEPOSITS

[75] Inventor: Jean-Philippe Rieux, Meyzieu, France

[73] Assignee: Rhone-Poulenc Industries, Paris, France

[21] Appl. No.: 962,696

[22] Filed: Nov. 21, 1978

Related U.S. Application Data

[62] Division of Ser. No. 864,709, Dec. 27, 1977, Pat. No. 4,168,614.

[30] Foreign Application Priority Data

Dec. 27, 1976 [FR] France ............................. 76 39802

[51] Int. Cl.$^3$ ............................................ C08L 33/08
[52] U.S. Cl. .................. 260/29.6 RW; 260/29.7 UP; 260/29.7 W
[58] Field of Search ............... 260/29.6 RW, 29.7 UP, 260/29.7 W

[56] References Cited

U.S. PATENT DOCUMENTS

| | | | |
|---|---|---|---|
| 2,927,095 | 3/1960 | Witt | 260/29.7 UP |
| 3,281,385 | 10/1966 | Berten et al. | 260/29.7 UP |
| 3,596,469 | 8/1971 | Higashimura et al. | 61/36 C |
| 3,651,002 | 3/1972 | Higashimura et al. | 61/36 C |
| 3,696,621 | 10/1972 | Simms et al. | 61/36 C |

FOREIGN PATENT DOCUMENTS 2279891   2/1976  France .................................... 61/36

*Primary Examiner*—Maurice J. Welsh
*Attorney, Agent, or Firm*—Burns, Doane, Swecker & Mathis

[57] ABSTRACT

Mining deposits, e.g., coal fields, are consolidated by injecting therein a composition which includes (a) an aqueous dispersion of a vinyl polymer, (b) at least one water-soluble acrylic monomer, and (c) a curing amount of an in situ polymerization catalyst for the acrylic monomer(s) (b); and thence permitting the composition to cure, in situ, into an adherent, consolidating gel matrix for the loose deposit.

9 Claims, No Drawings

COMPOSITIONS USEFUL FOR CONSOLIDATION OF MINING DEPOSITS

This is a division, of application Ser. No. 864,709, filed Dec. 27, 1977, now U.S. Pat. No. 4,168,614 issued Sept. 25, 1979.

BACKGROUND OF THE INVENTION

1. Field of the Invention

The present invention relates to the consolidation or solidification of mining deposits, e.g., coal fields, by injecting therein, and subsequently polymerizing, in situ, certain polymerizable polymer/monomer dispersions.

2. Description of the Prior Art

The complex art of consolidation or solidification of earth has long been replete with an abundance of literature reports in which the most diverse means have been proposed for resolving such problem. Nonetheless, insofar as the consolidation of mining beds, coal fields, ore and mineral deposits is concerned, and the difficult and complex problems with which the same is faced, the state of the art is conspicuously devoid of more than but a few meaningful solutions. In fact, in addition to the inherent difficulties in any ground consolidation process, which arise from the nature of the land, from its cohesiveness, looseness and/or compactness, and from the nature and state of any fissures or "seams" permeating same, such mining sites are also subject to the effects of the pressure in the ground, which effects are caused by working, and especially by the dynamics involved in the progression of the stopes. Furthermore, since any injection of a consolidating material, for example, is carried out, by definition, near a face surface, it is not possible to use injection pressures which are relatively high, because such pressures likely would cause rupturing of the earth body instead of consolidating same. And in addition to these problems which are mechanical in nature, there too are safety problems, and it is a truism that the use of flammable materials and/or materials which are capable of evolving toxic substances is definitely not recommended in mining excavations. Further along these lines, the technique proposed in French patent application No. 2,279,891, namely, the use of resins of polyurethane type, is not entirely satisfactory. According to this patent (page 2, lines 29 to 32), such products, once polymerized, exhibit great flexibility, and display high values for modulus of elasticity and flexural strength, and they also develop a significant binding or adhesive force between the coal and the surrounding rock, stone or ground. Contrariwise, it too is known, on the one hand, that polyurethanes are flammable materials and that their combustion releases carbon monoxide and hydrocyanic acid; while on the other hand, when carrying out a consolidation by injection under pressure, the recommended pressure, according to the patent (page 11, line 18), is quite high (60 bars).

SUMMARY OF THE INVENTION

Accordingly, a primary object of this invention is to provide for the consolidation or solidification of mining deposits, e.g., coal fields or mines, by injecting therein, under moderate pressures, and subsequently polymerizing, in situ, certain polymerizable polymer/monomer dispersions. Once injected and polymerized, the dispersions according to the invention impart both excellent characteristics of adhesion to the coal and satisfactory impact resistance.

Other objects, advantages and features of the invention will become apparent to one skilled in this art from the description which follows.

DETAILED DESCRIPTION OF THE INVENTION

The dispersions to be cured, in situ, according to the invention are comprised of the following essential constituents:

(a) an aqueous dispersion of a vinyl polymer;
(b) one or more water-soluble acrylic monomers; and
(c) one or more compounds or curing agents capable of effecting the polymerization, in situ, of the acrylic monomer (or monomers).

As utilized herein and in the claims which follow, the expression "aqueous dispersion" denotes a mixtue consisting of a continuous phase comprising water and, in suspension in this aqueous phase, solid particles or droplets of a water-insoluble polymer.

The expression "vinyl polymer" similarly denotes a macromolecular compound resulting from the polymerization of one or more monomers containing at least one carbon-to-carbon double bond of ethylenic unsaturation, and the expression "acrylic monomer" denotes a compound comprising the moiety

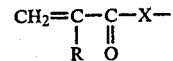

in which R represents a hydrogen atom or a —CH$_3$ radical, X represents an oxygen or nitrogen atom, and which compound is necessarily water soluble.

The aqueous dispersions of vinyl polymer can be prepared according to techniques and methods which are well known to the art, and widely described in the literature; although it is possible to prepare the polymer separately, and then disperse same in water, it is more advantageous to employ the customary methods of emulsion or suspension polymerization, or emulsion or suspension copolymerization, and thence directly utilize such resultant products. Compare in this respect any one or more of the following texts (hereby expressly incorporated by reference):

Schildknecht, *Vinyl and Related Polymers*, John Wiley & Sons (1952);

Bovey et al, *Emulsion Polymerization*, Interscience (1955);

Leonard, *Vinyl and Diene Monomers*, Wiley-Interscience.

The vinyl polymer can be prepared from many and various monomers; these monomers typically contain from 2 to 12 carbon atoms and one or two sites of ethylenic unsaturation. Exemplary of such monomers, there are mentioned unsaturated hydrocarbons, such as ethylene, propylene, isobutylene, butadiene, isoprene, styrene and chlorobutadiene; vinyl derivatives such as vinyl chloride, vinylidene chloride; and vinyl esters of saturated aliphatic acids having up to 6 carbon atoms, in particular vinyl acetate and vinyl butyrate, or of an aromatic acid, such as vinyl benzoate; acrylic derivatives, such as acrylonitrile or esters of acrylic or methacrylic acids with saturated aliphatic or cycloaliphatic alcohols having up to 8 carbon atoms; and maleic anhydride.

As representative of the vinyl polymers which can be used according to the invention and which are derived from the above-mentioned monomers, there are preferred those polymers resulting from the copolymerization of a vinyl monomer containing an aromatic ring, such as styrene, with comonomers which are relatively insensitive to water, such as acrylic monomers, in particular the following monomers: methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate and cyclohexyl acrylate.

The aforesaid aqueous dispersions of the vinyl polymer advantageously contain from 20 to 60% of dry polymer. The amount of aqueous dispersion preferably represents from 75 to 95% of the total weight of the mixture of aqueous dispersion of vinyl polymer (a)+acrylic monomer (b).

The choice of the constituent (b), the acrylic monomer, is essentially dependent upon the solubility characteristics of such monomers in water. By way of illustration of such monomers, there are mentioned, in addition to acrylic acid itself, amides derived from this acid, in particular acrylamide and the N-alkylacrylamides in which the alkyl group contains from 1 to 4 carbon atoms, especially N-methylacrylamide, N-ethylacrylamide and N-tert-butylacrylamide; methylolacrylamide or methylolmethacrylamide can also be used. Acrylamide, nonetheless, is the preferred monomer.

The amount of acrylic monomer (b) advantageously comprises from 5 to 25% of the total weight of the mixture of polymer dispersion (a)+monomer (b).

The third essential constituent of the subject compositions is a compound or group of compounds capable of causing the polymerization or effecting cure, in the vinyl polymer dispersion, of the acrylic monomer. In general, a compound is employed which generates free radicals and which is water-soluble or miscible with water. By way of example, there are mentioned the inorganic peroxy compounds, such as potassium persulfate or ammonium persulfate, hydrogen peroxide, or organic peroxide compounds, such as acyl peroxides, for example, acetyl, propionyl, phenylacetyl and benzoyl peroxides, alkyl peroxides, for example t-butyl peroxide, and aliphatic or aromatic hydroperoxides, for example t-butyl, benzyl and cumyl hydroperoxides.

In general, the amount of catalyst (c) ranges from 0.1 to 5% of the weight of the acrylic monomer (b).

According to a preferred method, a reducing agent is associated with the catalyst as defined above. By way of illustration of such agents, there are mentioned as preferred sodium pyrosulfite, sodium metabisulfite, and tertiary amines, such as dimethylaminopropionitrile, dimethylaminoacetonitrile, triethanolamine, dimethylethanolamine and tetramethylethylenediamine.

Particularly desirable results have been obtained by using the ammonium persulfate/triethanolamine pair.

Typically, the amount of reducing agent, if such a cocatalyst indeed be used, is of the same order of magnitude as the amount suggested for the catalyst.

The compositions according to the invention can contain ingredients other than the compounds (a), (b) and (c) described above. Among such adjuvants, there are first mentioned those monomers capable of enabling the cross-linking or reticulation of the polymer formed in situ from the acrylic monomer (hereinafter "cross-linking monomers"). These cross-linking monomers are desirably selected from those compounds containing at least two carbon-to-carbon double bonds capable of reacting to form a three-dimensional network with the acrylic polymer. Such compounds can be polyacrylic derivatives, such as methylene-bis-acrylamide, methylene-bis-methacrylamide, 1,2-dihydroxyethylene-bis-acrylamide, 1,2-dihydroxyethylene-bis-methacrylamide, 1,2-n-methyloldihydroxyethylene-bis-acrylamide, 1,3-bis-acrylamido-methyl-2-imidazolidone or 1,3-bis-methacrylamidomethyl-2-imidazolidone; comonomers containing at least two carbon-to-carbon double bonds of the vinyl, allyl or maleic type can also be used. Preferred are those cross-linking monomers which are soluble or dispersible in water. The amount of cross-linking monomer can generally range up to 5% of the weight of the acrylic monomer.

Representative of the other adjuvants contemplated, there are mentioned solidification retarders, whose purpose it is to control the solidification time of the composition. Potassium ferricyanide is an efficient agent for this purpose. Depending on the desired solidification time, the amount of retarding agent can range from 0.005 to 0.1% of the weight of the acrylic monomer (b).

It is also envisaged to use adjuvants to modify the pH of the composition. Typically according to the invention a composition is used, the pH of which is situated between 5 and 9. In the event that the presence of the other ingredients makes it impossible to obtain a pH in this range, one or more compounds of an acid character (sulfuric, hydrochloric, phosphoric, acetic, oxalic, tartaric and citric acids) or of a basic character (sodium hydroxide and potassium hydroxide) can be incorporated into the subject compositions to so alter the pH level.

Finally, the compositions according to the invention can contain auxiliary agents such as fillers and/or pigments (for example talc, titanium oxide or kaolin), emulsifying agents which either may or may not be ionic in character, plasticizers, thickeners and anti-gelling agents.

The compositions according to the invention are particularly valuable for the consolidation of mining beds by pressure injection. After mixing together all constituents (essential constituents and, optionally, the above-mentioned adjuvants), the composition can be injected directly, under a pressure of the order to a few bars, desirably in the range of from 0.1 bar to 6 bars, without it being necessary to apply a high pressure thereto, or to inject the several constituents separately in order to avoid mixing and reaction of same until such time as they are within, or form a matrix for, the material to be consolidated.

The amount of the consolidating composition to be injected is not critical and may vary over wide limits depending upon the nature of the bed, deposit, field or "seam" to be consolidated. Typically, however, such compositions are injected in amounts of from about 20 to 50 liters per cubic meter of mining deposit to be consolidated.

The consolidation technique as per this invention is valuable in numerous respects, independently of the advantages attained by the great ease of injection of the subject compositions: on the one hand, the non-toxicity and non-flammability of such compositions and, on the other hand, the effectiveness and extent of the reinforcement; in fact, excellent adhesion of the consolidating mass is observed, both to rock (sandstone and shales) and to coal; and the earth consolidated in this fashion exhibits good impact resistance. It should of course also be understood that, although the compositions according to the invention are particularly useful for the consolidation of mining beds and deposits, the use of such compositions in other fields would be well within the scope of the invention.

In order to further illustrate the present invention and the advantages thereof, the following specific example is given it being understood that the same is intended only as illustrative and in nowise limitative.

EXAMPLE

In conducting this example, a vinyl polymer having the following characteristics was used: an aqueous dispersion of a styrene/n-butyl acrylate copolymer having a solids content of 50% by weight; the glass transition temperature of which being 16° C. and the diameter of the particles being about $0.1\mu$; the pH of the dispersion was about 5.

(a) Formulation:
The following products were mixed:

| | |
|---|---|
| Water | 20 g |
| Acrylamide | 15.7 g |
| Methylene-bis-acrylamide | 0.32 g |
| Vinyl polymer dispersion | 64 g |
| Triethanolamine | 0.24 g |
| Potassium ferricyanide | 0.0032 g | and the pH was adjusted to 6.3 by adding platelets of sodium hydroxide (NaOH).

0.5 g of ammonium persulfate was incorporated into this mixture. The initial viscosity of the resultant composition was 12 cP at 25° C.

The solidification time, i.e., the time required until a gel state was attained, was 30 minutes at 20° C.

(b) Experiment for consolidation of coal:
The purpose of this test was to demonstrate the properties of the composition, both as regards the injection of composition within the material to be consolidated, and also as regards the resultant consolidation. The procedure was carried out in the following manner:

A cylindrical chamber having a diameter of 40 mm and a length of 1 meter was constructed from a sheet of transparent polyester. This chamber, which was placed in a vertical position, was equipped at its lower end with expansion valves through which an injection nozzle was passed; the other end of the chamber was closed with a steel disc. Pulverized coal (particles having dimensions of less than 1 millimeter) was introduced into the chamber to a height of 50 cm.

The reinforcing composition was then injected at the base of the chamber by means of a volumetric pump, the flow-rate of which was regulated between 0.6 and 3 l/hour.

The pressure at the compressor was measured for a given flow-rate; this information making it possible to indicate, in particular, the increase in the viscosity of the composition during injection.

After injection, the injection nozzle was closed and the pump was isolated. The cylindrical products obtained were stored in a vertical position for 4 days, and then cut into test-pieces having a height of 8 cm, which were thence subjected to a test for crush strength, at a crushing speed of 0.5 cm/minute: hereinafter Sc (compound).

A cylinder was also prepared which comprises exclusively the reinforcing composition (pure gel), and its crush strength was measured under the same conditions: hereinafter Sc (pure gel).

A coefficient $\alpha$, which is deemed the coefficient of reinforcement, is thus determined by the ratio $$\frac{Sc \text{ (compound)}}{Sc \text{ (pure gel)}};$$

it being seen that, if this coefficient be less than 1, the cohesiveness of the compound is poor; on the other hand, a coefficient $\alpha$ which is equal to at least 1 indicates good adhesion between the coal and the reinforcing composition.

Furthermore, the mean relative deformation at break was determined, both on consolidated coal (compound) and on pure gel; the value obtained corresponding to the value of the elongation at the point of maximum breaking strength.

(c) Results and interpretation:
The initial viscosity of the composition was 12 cP.

Since the injection was carried out at a flow-rate of 3 l/hour, the pressure at the injection pump changed from 0.8 to 3 bars in 10 minutes (time necessary to inject the composition into the column of pulverized coal), which markedly demonstrates that the increase in the viscosity of the composition is slow during the injection phase.

The crush strength of the compound (Sc compound), was 4 bars (mean value, determined using 6 test-pieces).

The crush strength of the pure gel (Sc pure gel) was 0.9 bars.

The coefficient $$\alpha \left( \frac{Sc \text{ compound}}{Sc \text{ pure gel}} \right)$$

was, therefore, 4.4, which reflects excellent adhesion between the pulverulent coal and the consolidating composition.

The mean relative deformation at break measured on pure gel was 50%, this deformation measured on the compound being 11%. These values demonstrate the good resistance (impact resistance) of the consolidated coal masses.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter consisting essentially of (a) from about 75 to 95% by weight of an aqueous dispersion of a vinyl polymer, (b) from about 5 to 25% by weight of at least one water-soluble acrylic monomer, both percentages being based upon the total weight of the components (a) and (b), (c) a curing amount of a polymerization catalyst for the acrylic monomer (b), and (d) up to 5% by weight, based upon the weight of acrylic monomer (b), of a cross-linking monomer.

2. A composition of matter comprising (a) from about 75 to 95% by weight of an aqueous dispersion of a vinyl polymer, (b) from about 5 to 25% by weight of at least one water-soluble acrylic monomer, both percentages being based upon the total weight of the components (a) and (b), (c) a curing amount of a polymerization catalyst for the acrylic monomer (b), and (d) up to about 5% by weight, based upon the weight of acrylic monomer (b), of a cross-linking monomer.

3. The composition of matter as defined by claim 2, the vinyl polymer comprising the aqueous dispersion (a) being selected from the group consisting of polyethylene, polypropylene, polyisobutylene, polybutadiene, polyisoprene, polystyrene, polychlorobutadiene, polyvinyl chloride, polyvinylidene chloride, polyvinyl acetate, polyvinyl butyrate, polyvinyl benzoate, polyacrylonitrile, polyesters of acrylic or methacrylic acid with a saturated aliphatic or cycloaliphatic alcohol having up to 8 carbons, and polymaleic anhydride.

4. The composition of matter as defined by claim 2, the vinyl polymer comprising the aqueous dispersion (a) being a copolymer of a vinyl aromatic monomer and a comonomer selected from the group consisting of an alkyl acrylate, an alkyl methacrylate, a cycloalkyl acrylate and a cycloalkyl methacrylate.

5. The composition of matter as defined by claim 4, the vinyl polymer comprising the aqueous dispersion (a) being a styrene/alkyl acrylate copolymer.

6. The composition of matter as defined by claim 2, the acrylic monomer (b) being selected from the group consisting of acrylic acid, acrylamide, N-alkylacrylamide, N-methylolacrylamide and N-methylolmethacrylamide.

7. The composition of matter as defined in claim 6, the acrylic monomer (b) being acrylamide.

8. The composition of matter as defined by claim 2, further comprising a member selected from the group consisting of a solidification retarder, a pH modifier, a filler, a pigment, an emulsifying agent, a plasticizer, a thickener, an anti-gelling agent, and admixtures thereof.

9. The composition of matter as defined by claim 2, having a pH of from 5 to 9.

* * * * *